United States Patent Office 3,433,963
Patented Mar. 18, 1969

3,433,963
METHOD AND APPARATUS FOR PRODUCTION AND ISOLATION OF PHOTOELECTRIC SIGNALS GENERATED BY ATOMIC RESONANCE LINES
Alan Walsh, Brighton, Victoria, and John V. Sullivan, Carnegie, Victoria, Australia, assignors to Commonwealth Scientific and Industrial Research Organization, East Melbourne, Victoria, Australia, a body corporate
Continuation-in-part of application Ser. No. 389,644, Aug. 14, 1964, which is a continuation-in-part of application Ser. No. 379,067, June 5, 1964. This application Nov. 7, 1967, Ser. No. 681,283
Claims priority, application Australia, June 12, 1963, 31,735/63; Dec. 30, 1966, 15,996/66; June 1, 1967, 22,606/67
U.S. Cl. 250—217　　　　　　　　　　　　11 Claims
Int. Cl. G02p 1/36

ABSTRACT OF THE DISCLOSURE

Atomic spectral radiation characteristic of a particular chemical element is directed through a cloud of ground state atoms of that element so that the resonance lines of spectral radiation are selectively absorbed. The population of the ground state atoms within the cloud is then pulsed so as to correspondingly modulate the degree to which the resonance lines are absorbed. The atomic cloud is generated by a gaseous discharge which gives rise to cathodic sputtering and the population of ground state atoms in the cloud is varied by varying the discharge current which varies, in turn, the degree of sputtering. In this way, the resonance line or lines can be selectively modulated to the exclusion of all other radiation so that signals produced by this selective modulation can be isolated by means of an AC detection system.

CROSS-REFERENCE TO RELATED APPLICATIONS

This application is a continuation-in-part of application Ser. No. 389,644 filed Aug. 14, 1964, and now abandoned, which in turn is a continuation-in-part of application Ser. No. 379,067 filed June 5, 1964, and also abandoned.

BACKGROUND OF THE INVENTION

Field of the invention

This invention relates to techniques and apparatus for selectively modulating resonance lines in atomic spectra and, more particularly, is concerned with the production and isolation of those photoelectric signal components generated by atomic resonance lines in a beam of incident radiation. Since it is possible by such techniques to effectively isolate resonance spectral lines from radiation at all other wavelengths, these techniques find application in many fields of spectroscopy and colorimetry; but, they have particular relevance in atomic absorption spectroscopy because of its concern with resonance lines. Nevertheless, the proposed apparatus and techniques also provide a convenient method whereby sources of reference spectra for wavelength calibration, or for the identification of atomic spectral lines, may be obtained.

Description of the prior art

The term "resonance line" as used herein may be, perhaps, best explained by reference to the established art, for it is well known that, if radiation from an atomic spectral light source characteristic of a given element is allowed to fall on an atomic vapor of the same element, selected lines of the spectra emitted by the light source will be partially absorbed and reemitted by the atomic vapor. For historical reasons, such atomic spectral lines became known as atomic "resonance lines" but, in current terminology, it is understood that such lines are those which can be absorbed or emitted by virtue of electron transitions to or from the ground state of the atom.

It is known that selected wavelength bands within a beam of radiation can be intensity-modulated by periodically interposing a selective absorbing medium in the light beam thus producing a modulation of all wavelengths which lie within the region of strong absorption by the medium. For example, infrared gas analysers employing this principle are in commercial use. It is also known (Alkemade, C. T. I., and Milatz, J. M. W., Appl. Sci. Res. B4 289, 1955) to selectively modulate atomic resonance lines in an incident light beam by periodically interposing a flame into the beam while spraying into the flame a compound of an element having those atomic resonance lines in its spectra.

The former method suffers from the fact that broad wavelength bands, rather than specific spectral lines, are modulated by the interposition of the absorbing medium; while, in the latter method, many elements, such as aluminum, zirconium and silicon, form refractory compounds in the flame so that very few free atoms of the element are available to absorb the resonance lines concerned. Even with the most suitable elements, the depth of selective modulation obtainable in practice is small. Moreover, both the above described prior art methods have the serious disadvantage that they depend largely upon the mechanical means for interposing the absorbing medium in the light beam, either by the utilization of substantially conventional double beam techniques, or by the use of mechanically driven shutter arrangements.

SUMMARY OF THE INVENTION

The object of the present invention is therefore to provide apparatus and techniques of the type indicated but which are not subjected to the above mentioned disadvantages and limitations. The invention also seeks to provide a simple and effective "selective modulation lamp" for emitting atomic spectral radiation characteristic of a particular chemical element in which the resonance lines are selectively modulated.

According to the invention, there is provided a method for producing and isolating photoelectric signals generated by atomic resonance lines, comprising the steps of: producing a cloud of substantially unexcited atomic vapor by cathodic sputtering in a gaseous discharge from a cathode containing a chemical element which has the aforementioned resonance lines in its atomic spectrum; generating radiation including the resonance lines by means of an atomic spectral light source employing said chemical element; directing said radiation through said cloud of atomic vapor whereby the resonance lines within the radiation are at least partially absorbed by the cloud; varying the amount of atomic vapor within the cloud, and therefore the degree to which the resonance lines are absorbed, by electrical modulation of said gaseous discharge; and detecting the radiation which is transmitted from said light source through the cloud of atomic vapor by means of an AC photoelectric system so as to thereby isolate the AC component of the photoelectric signal produced by said transmitted radiation.

The atomic spectral light source may be, for example, a conventional hollow cathode lamp or a high intensity spectral lamp like that described in our U.S. Patent No. 3,305,746 or a thermal spectral lamp such as described in our copending U.S. application Ser. No. 695,386, filed January 3, 1968. Preferably, the atomic vapor is produced inside a hollow cylindrical cathode and the radiation from the light source is allowed to pass through the hollow cathode in a generally axial direction. The discharge which produces the cathodic sputtering may be modulated by driving the discharge from a supply of alternating current, but it is preferable to employ a pulsed direct current source.

BRIEF DESCRIPTION OF THE DRAWINGS

In order that the invention may be more fully and completely understood, a presently preferred technique and a number of "selective modulator lamps" will now be described in detail by way of an example and with reference to the accompanying drawings, in which.

DETAILED DESCRIPTION OF THE INVENTION

Figure 1:
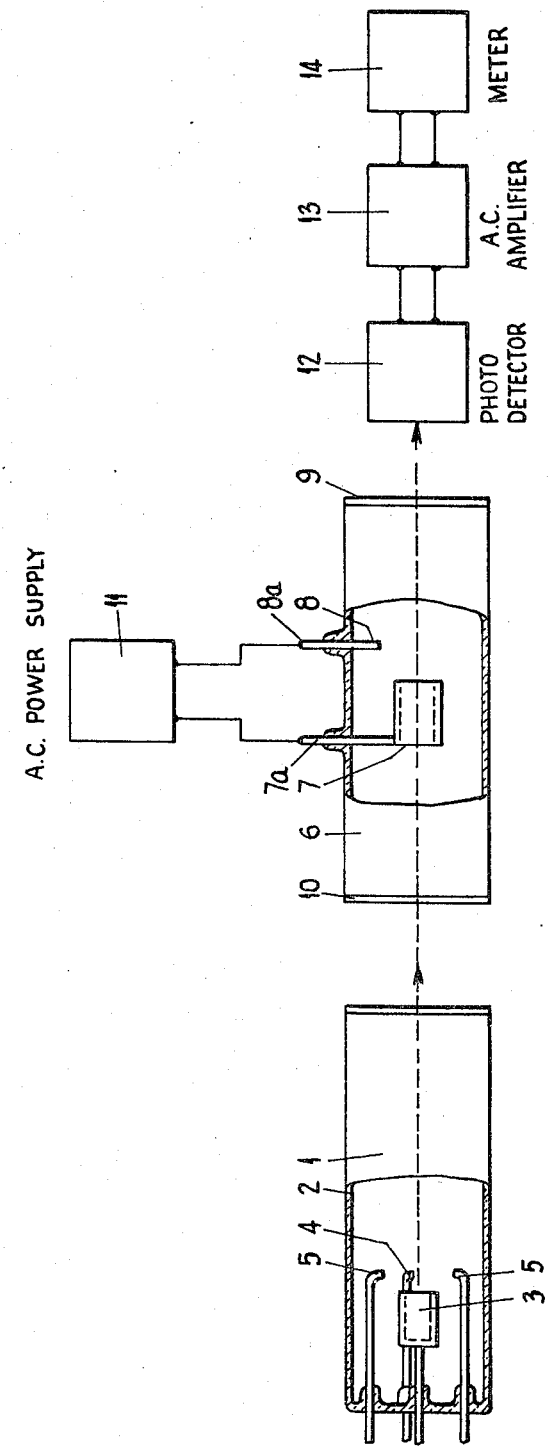
FIGURE 1 is a diagrammatic representation of apparatus formed in accordance with this invention for the modulation of atomic resonance lines in the spectrum of a given metal, in this case copper.

In FIGURE 1 the source of radiation is an atmoic spectral lamp 1, of the type described in our U.S. Patent No. 3,305,746. This spectral lamp, which is shown partly cut-away in FIGURE 1, consists essentially of a glass envelope 2 containing a rare gas at low pressure, a hollow cathode 3 made of copper, a wire anode 4 (shown behind the cathode 2) and a pair of auxiliary wire electrodes 5. In operation a discharge is first initiated between the cathode 3 and the anode 4, giving rise to cathodic sputtering from the cathode 3. A secondary discharge is then produced between the electrodes 5 in order to further excite the atomic vapor sputtered from the cathode 3, and thereby generate atomic spectral radiation of comparatively high intensity characteristic of the element comprising the cathode 3; that is, copper in this example.

This spectral radiation is passed through a second hollow cathode discharge device 6 (the "selective modulator") which also consists of a glass envelope containing a rare gas at low pressure, a cathode consisting of a hollow cylinder of copper 7 which is open at both ends, and a wire anode 8. Windows 9, 10, transparent to the resonance radiation concerned, are provided at either end of the envelope. A power supply 11 for the lamp 6 is connected to the cathode terminal 7a and the anode terminal 8a which are sealed into the glass envelope in a conventional manner. The filling gas and pressures employed may be those used in known hollow cathode spectral lamps; that is, for example, neon or argon at ½–10 mm. mercury.

The number of the copper atoms generated in the "cloud" within the hollow cathode of tube 6 is dependent on the degree of cathodic sputtering which is, in turn, dependent upon the current supplied to the discharge by the power supply 11; but the current should be kept below the level where substantial excitation of, and spectral emission from, the cloud of atoms takes place, since all such radiation will be modulated by the pulsatory discharge and represent a spurious signal. The degree of such undesirable excitation will vary with the geometry of the cathode for a given discharge current. A loop or tubular cathode is preferred because the sputtered atoms concentrate in the center to form the desired cloud; but the diameter of such cathodes should be kept large relative to the axial length to avoid the "hollow cathode" self-excitation phenomenon exploited in the spectral lamp. If desired, a rod or bent wire cathode of other shapes may be employed.

The modulation of the current supplied to lamp 6 may be, for convenience, obtained by half or full wave rectification of the AC mains supply by the power supply unit 11. Such a modulated current supply has the effect of "pulsing" the generation of the atomic cloud within cathode 7 because the copper atoms are sputtered from the cathode anly when it is at a negative potential with respect of the anode 8. It is preferable however to employ a pulsed DC current supply as unit 11. Thus, the number of copper atoms within hollow cathode 7 can be controlled and modulated so that the intensity of those atomic spectral lines within the incident radiation which are characteristically absorbed by the cloud (i.e., the copper resonance lines) will be modulated.

As shown in FIGURE 1, the light beam which emerges from the second discharge lamp 6 is allowed to fall on a photoelectric 12 which may be, for example, a photomultiplier tube. Since the resonance lines of many elements, including copper, are relatively intense with respect to the other spectral lines, the output signal from the photodetector 12 will contain a significant AC component at the chosen modulation frequency. This modulated electrical signal component can easily be isolated from other signal components by conventional means; for example, by the use of an AC amplifier 13 which rejects all signals which are not modulated. Thus, an electrical signal which is due only to the atomic resonance lines emitted by the atomic spectral lamp emerges from the amplifier 13 to a suitable read out device 14, such as a meter or chart recorder.

It will be seen that the above described technique enables resonance lines in atomic spectra to be selectively modulated with respect to other spectral lines and background radiation without the use of moving parts, which are liable to fail, or function in a faulty or inaccurate manner. If the lamps and detector are housed in a suitable light-tight box and if a simple absorption filter is employed to reduce the intensity of radiation at wavelengths remote from the principal resonance lines concerned, a very substantial percentage depth of modulation can be achieved.

Figure 2:
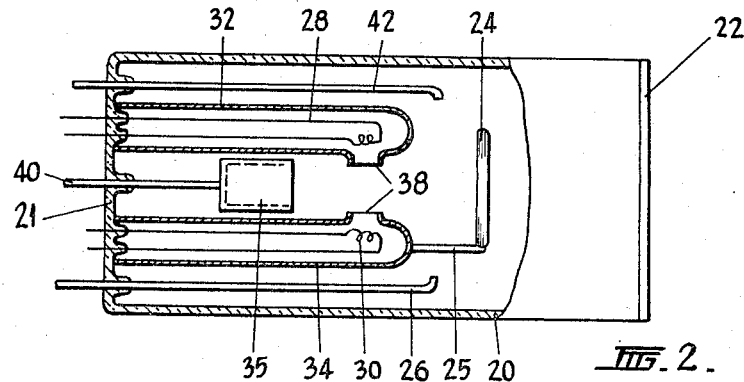
FIGURE 2 is a longitudinal diagrammatic partial section of a selective modulator lamp incorporating an atomic spectral light source.

It will be apparent that the electrodes of the atomic spectral light source and the electrodes giving rise to modulation of the resonance lines can, if so desired, conveniently be housed in a single envelope. Such a combined "selective modulator lamp" is shown in FIGURE 2. This lamp comprises a tubular envelope 20 closed by an integral base 21 and an end window 22 opposite the base, the lamp being filled with a rare gas, such as neon, at low pressure-as in conventional hollow cathode lamps. A wire loop cathode 24 (mounted on its lead-in wire 25) together with its associated anode 26 comprise the selective modulator portion of the lamp; these latter electrodes, in operation are connected to a pulsed or alternating current power supply such as that shown at 11 in FIGURE 1.

The spectral lamp incorporated within the envelope 20 is also formed in accordance with our U.S. Patent No. 3,305,746; but, in this instance, it employs heated oxide-coated filaments 28 and 30 which are respectively housed in tubular shields 32 and 34. For operation on DC only, the cathode need be oxide-coated. Shields 32 and 34 are mounted opposite one another on either side of the hollow cathode 36 (which is, as before, formed from the desired element), said shields having opposing apertures 38 formed therein at a level somewhat above the top of the hollow cathode 36. Hollow cathode 36 is supported on its lead-in wire 40 and is associated with the wire anode 42. The operation of this selective modulator lamp is substantially identical with the combined operation of the lamps 1 and 6 of FIGURE 1; except, of course, that separate exciting filament supplies are required and that the two sections of the device are pre-aligned.

Figure 3:
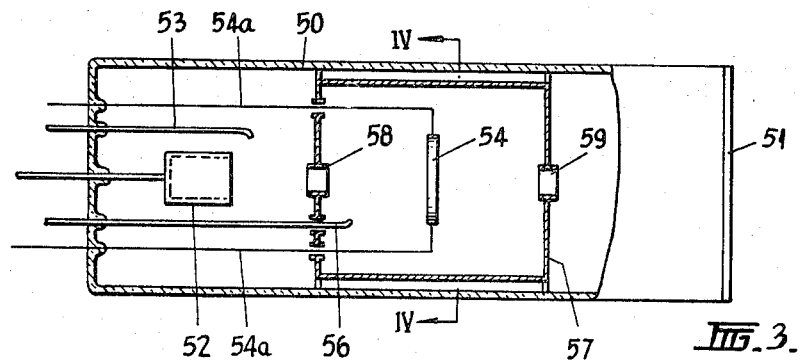
FIGURE 3 is a longitudinal section view of a modified selective modulator lamp.
Figure 4:
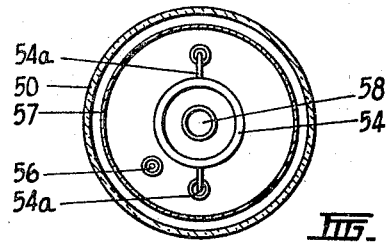
FIGURE 4 is a transverse section of the lamp of FIGURE 3 taken at plane IV—IV.

Another alternative form of selective modulator lamp is shown in FIGURES 3 and 4. This lamp also comprises a single envelope 50 having a window 51 and contains a hollow cathode 52 and its associated anode 53. The modulating cathode takes the form of a ring 54 which is supported in the envelope by two lead-in wires 54a; an associated anode 56 being provided as before. The ring cathode 54 is enclosed by a shield 57 provided with aligned apertures 58, 59 to allow the passage of light through the lamp and out through the window 51 at the end of the lamp. Other apertures are provided in the shield 57 to allow the passage of the lead-in wire supports 54a and a portion of the anode 56. The shield 57 has a threefold purpose. Firstly, being opaque, it serves as an optical shield to block a substantial portion of the light emission from the modulating gaseous discharge between electrodes 54 and 56. Secondly, the shield acts as a rudimentary collimator for the light passing from the cathode 52 through the modulator and out of the lamp through window 51. Thirdly, the shield isolates the modulating discharge from the hollow cathode discharge so as to reduce the likelihood of interaction therebetween.

It will be noted that the atomic spectral light source incorporated in the selective modulator lamp of FIGURES 3 and 4 is a simple hollow cathode device which does not employ the separate exciting discharge of the high intensity light source depicted in the other embodiments. While this reduces the useful light output of the lamp as a whole, the use of the shield 57 mitigates this disadvantage and, provided suitable hollow cathode lamp techniques are employed, the light output of such a modulator lamp is adequate for many colormetric measurements with fluidflow cells of small dimension.

Figure 5:
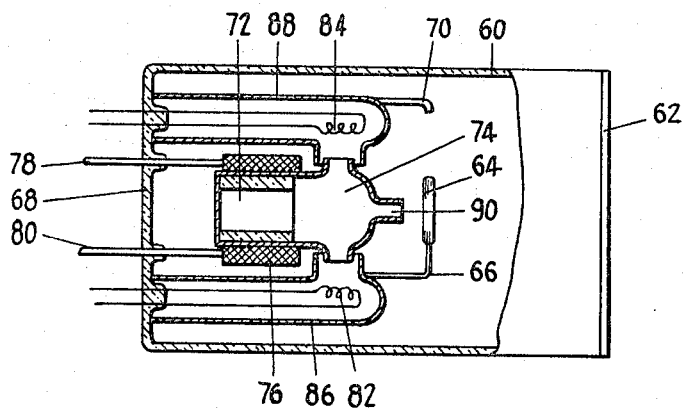
FIGURE 5 is a longitudinal section of a lamp similar to that shown in FIGURE 2 except that, in this lamp, the atomic vapor is generated by thermal means.

Finally, FIGURE 5 of the accompanying drawings shows a selective modulator lamp similar in many respects to that of FIGURE 2, but instead of employing a hollow cathode high intensity spectral light source, the embodiment of FIGURE 5 uses a source in which the atomic vapor is thermally generated. While this form of lamp has been described in our copending patent application No. 695,386, and while it can produce intense spectral radiation, it is only applicable to a relatively small range of chemical elements. However, some of the suitable elements—such as, potassium, sodium and magnesium—are of great interest to the chemical analyst.

As in the embodiment of FIGURE 2, the electrodes of the selective modulator lamp of FIGURE 5 are enclosed in a single glass envelope 60 having a suitable end window 62 and filled with an inert gas—such as neon, helium or argon—in accordance with known hollow cathode techniques. Again, the modulating cathode 64 comprises a loop or grid of wire formed from the element concerned and supported on a lead 66 which passes through the base 68 of the envelope; the anode 70 for the modulating discharge also being a wire-like member which is supported by its passage through the base of the lamp. However, in this embodiment the elemental material in the spectral light source is in the form of a simple tube which is pressed into the base of a sheet metal chamber 74. A heating element 76 molded around the base of the chamber 74 so that, when operative, the body 72 of the chemical element 72 is indirectly heated within the chamber; the chamber itself being supported from base 68 by rods 78 and 80 which also serve as leads for the element 76.

The vapor generated in the chamber is excited by a transverse gaseous discharge directed transversely across the chamber between exciting electrodes 82 and 84 housed within opposing shields 86 and 88 respectively. (The arrangement of the electrodes and the operation of the exciting discharge are substantially the same as described for the exciting discharge of the modulating lamp of FIGURE 2.) Spectral radiation from the confined and excited atomic vapor emerges from the opening 90 in the end of the chamber 74 opposite the window 62 so that this radiation will pass through, or adjacent to, the modulating electrode 64. Thus, apart from the mode of generation of the atomic vapor in the spectral light source, the lamp of FIGURE 5 operates in substantially the same way as the combined lamp of FIGURE 2. (It is clear, of course, that the lamps of FIGURES 2, 3 and 5 may be employed in the system illustrated in FIGURE 1 in place of the separate lamps depicted.)

It will be appreciated from the above that the present invention is not only concerned with a novel method for producing and isolating photoelectric signals generated by the resonance lines in atomic spectral radiation but it is also concerned with "selective modulator lamps" for use in this technique and with apparatus embodying such lamps for the performance of the method.

What is claimed is:

1. A method for producing and isolating photoelectric signals generated by atomic resonance lines comprising the steps of: producing a cloud of substantially unexcited atomic vapor by cathodic sputtering in a gaseous discharge from a cathode containing a chemical element which has the aforementioned resonance lines in its atomic spectrum; generating radiation including the resonance lines by means of an atomic spectral light source employing said chemical element; directing said radiation through said cloud of atomic vapor whereby the resonance lines within the radiation are at least partially absorbed by the cloud; varying the amount of atomic vapor within the cloud, and therefore the degree to which the resonance lines are absorbed, by electrical modulation of said gaseous discharge; and detecting the radiation which is transmitted from said light source through the cloud of atomic vapor by means of an AC photoelectric system so as to thereby isolate the AC component of the photoelectric signal produced by said transmitted radiation.

2. A method according to claim 1, wherein said cathode is constructed in the form of an open-ended tube, the method being further characterized in that the radiation from said light source is directed axially through said cathode.

3. A method according to claim 1, wherein said cathode is constructed in the form of a ring, the method being further characterized in that the radiation from said light source is directed axially through said cathode.

4. A method according to claim 1, wherein the cloud of atomic vapor is generated in a pulsatory manner by driving the gaseous discharge with alternating current so that sputtering from the cathode occurs for only a portion of each cycle of said alternating current.

5. A method according to claim 1, wherein the amount of atomic vapor within the cloud is varied by driving the gaseous discharge with direct current having an alternating component such that sputtering occurs continuously from the cathode but the sputtering rate is modulated.

6. Apparatus for selectively modulating, by electrical means, the resonance lines contained in atomic spectral radiation which is characteristic of a chemical element and which is directed through said apparatus, said apparatus comprising:
(a) an envelope containing an inert gas at low pressure;
(b) two windows mounted opposite one another in said envelope for transmitting the radiation through the envelope;
(c) an open-ended tubular cathode electrode formed at least in part from the aforementioned chemical element, mounted within the envelope between said two windows, and arranged so that the extension of its axis passes through both windows;
(d) an anode electrode mounted within said envelope;
(e) electrical leads extending from said electrodes to the exterior of the envelope for the connecting an electrical power supply to said electrodes so that, in operation, a gaseous discharge giving rise to cathodic sputtering can be maintained between said electrodes and modulated by the power supply to vary the amount of sputtered vapor within the cathode electrode.

7. Apparatus for generating atomic spectral radiation wherein the resonance lines characteristic of a particular chemical element are selectively modulated, said apparatus comprising:

(a) an envelope containing an inert gas at low pressure;
(b) atomic spectral lamp means within said envelope and including the aforementioned chemical element and thereby being adapted to produce atomic spectral radiation characteristic of said chemical element;
(c) a cathode electrode formed at least in part from the said element and mounted within said envelope adjacent said lamp means so as to lie in the path of radiation produced thereby;
(d) an anode electrode associated with said cathode and mounted within the envelope to enable a gaseous discharge to be struck between it and the cathode;
(e) and a window formed within said envelope in line with said lamp means and said cathode so as to be in the path of radiation from said lamp means which passes closely adjacent said cathode.

8. Apparatus according to claim 7, wherein said atomic spectral lamp means (b) comprises a hollow cathode electrode formed at least in part from said element; and an anode electrode associated with said hollow cathode and mounted within the envelope to enable a gaseous discharge to be struck between it and the hollow cathode.

9. Apparatus according to claim 7, wherein said cathode (c) comprises a hollow cylinder mounted within said envelope so that said radiation may pass axially through the cylinder.

10. Apparatus according to claim 7, wherein said cathode (c) comprises a ring mounted within said envelope so that said radiation may pass axially through the ring.

11. Apparatus according to claim 7, wherein said cathode electrode and at least a portion of said anode electrode are enclosed within a shield; said shield having apertures therein for the passage of radiation from said lamp means.

References Cited

UNITED STATES PATENTS

| | | |
|---|---|---|
| 2,755,388 | 7/1956 | Weisz _____ 250—218 X |
| 2,847,899 | 8/1958 | Walsh. |
| 2,962,932 | 12/1960 | Kaprelian _____ 350—160 |
| 3,194,965 | 7/1965 | Ruff et al. _____ 313—112 X |
| 3,242,371 | 3/1966 | Sugawara et al. ___ 313—209 X |
| 3,264,511 | 8/1966 | Yamasaki _____ 313—209 |

OTHER REFERENCES

Bowman et al.: "Isolation of Atomic Resonance Lines by Selective Modulation," Spectrochimica Acta, vol. 22, pp. 205–210 (1966).

RALPH G. NILSON, *Primary Examiner.*

M. A. LEAVITT, *Assistant Examiner.*

U.S. Cl. X.R.

88—14; 250—218, 232; 313—178; 350—160